United States Patent Office 3,752,811
Patented Aug. 14, 1973

---

3,752,811
NOVEL N,N-BIS-(BIS-AMINO-s-TRIAZINYL)-ALKYLAMINES
Denis Varsanyi, Arlesheim, Basel-Land, and Willy Roth, Strengelbach, Switzerland, assignors to Ciba-Geigy Corporation, Ardsley, N.Y.
No Drawing. Application Oct. 4, 1967, Ser. No. 672,701, now Patent No. 3,594,374, dated July 20, 1971, which is a continuation-in-part of abandoned application Ser. No. 560,855, June 27, 1966. Divided and this application Mar. 4, 1971, Ser. No. 121,139
Claims priority, application Switzerland, June 30, 1965, 9,158/65
Int. Cl. C07d 87/40
U.S. Cl. 260—246 B                2 Claims

---

ABSTRACT OF THE DISCLOSURE

New N,N-bis-(bis-amino-s-triazinyl)-alkylamines of the formula

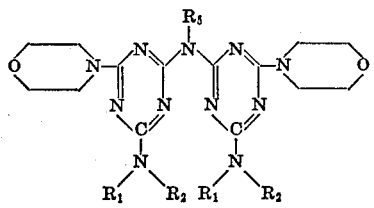

in which each of $R_1$ and $R_5$ represents alkyl or from 1 to 5 carbon atoms, and $R_2$ represents alkyl or from 10 to 18 carbon atoms, are useful as surface treating agents. Compositions containing these compounds are particularly useful as textile softeners.

---

CROSS-REFERENCE

This application is a division of application Ser. No. 672,701, filed Oct. 4, 1967, now U.S. Pat. No. 3,594,374, which in turn is a continuation-in-part of application Ser. No. 560,855 filed June 27, 1966, now abandoned.

DETAILED DISCLOSURE

This invention concerns new N-N-bis-(bis-amino-s-triazinyl)-alkylamines of the formula

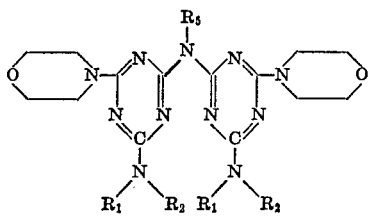

in which each of $R_1$ and $R_5$ represents alkyl of from 1 to 5 carbon atoms, and $R_2$ represents alkyl of from 10 to 18 carbon atoms. These compounds are useful as surface treating agents and find utility as textile softening agents.

These textile softening agents impart relatively little or no water repellence to detergent-hardened textile materials softened therewith, e.g. to towels and the like goods in which water-repellency is not desirable. The compounds are preferably applied from alsoholic, e.g. from isopropanol solution. Application from glacial acetic acid solution is also possible but less desirable in view of smell and acidity of such agents, even after dilution with water.

In the compounds of this invention, the presence of at least one amino group having one shorter and one longer alkyl substituent is necessary to obtain compounds suitable for use as main constituent in surface treating agents according to the invention.

The trisamino-s-triazine derivatives of this invention have well defined melting points and wax-like properties; they can thus be used instead of commercial natural and synthetic waxes or together therewith for the treatment and finishing of surface of all types. They have the characteristic properties of natural waxes such as solubility in fatty solvent, miscibility with natural and synthetic waxes and, with the addition of suitable emulsifying agents, can be worked up in water to form finely dispersed emulsions. The new compounds produce coatings which are resistant to chemicals, particularly they have good stability to alkali. In their excellent suitability as waxes, they are equivalent for all practical purposes to the montanic acid esters.

Surface-treating agents according to the invention are obtained by mixing a trisamino-s-triazine derivative of this invention or several such derivatives with the usual substances which are suitable for the treatment of surfaces. Such substances are, for example, the following: natural and synthetic waxves, resins, silicones, etc. which improve the physical properties, also solvents, as well as inorganic and organic fillers, e.g. silicates, milled plastics, anionic, cationic or non-ionic dispersing agents, cleaning agents such as, e.g. natural and synthetic soaps, tensioactive substances, pigments, agents to improve the stability to light, stabilizers of all types such as corrosion inhibitors, scents, dyestuffs, biocidal active substances or agents containing such substances, e.g. insecticides, fungicides, bactericides, etc.

More particularly, the surface-treating agents according to the invention, for instance in the form of floor polishes, can also contain, besides a compound or compounds of this invention, as main component, volatile solvents such as are used in wood-sealing agents, namely, ethyl acetate, acetone, methylethyl ketone, ethanol, toluene and the like.

The surface-treating agents according to the invention can be in the form of and used aerosols, solvents, emulsions, semi-solid and solid pastes.

Surface treating compositions according to this invention are prepared in the following manner.

(a)

4.250 parts of N,N-bis-[2' - N' - methyl-N'-n-octadecylamino-4'-morpholino - s-triazinyl-(6')]-N-ethylamine,
4.250 parts of wax (montanic acid ester, M.P. 80–83°; A.N. 20–30; S.N. 135–150),
4.250 parts of petroleum wax (M.P. 86–88°; A.N. 13–16; S.N. 45–55; penetration 4–6 at 100 g./25°/5 sec.),
0.850 part of olein,
0.765 part of the condensation product of oleyl alcohol and ethylene oxide (molar ratio about 1:5), as emulsifier,
0.680 part of aminomethyl propanol,
69.955 parts of water.

(b)

2.250 parts of colophonium-modified phenolic resin having a melting point of about 152°, the phenolic resin base of which is produced as described in Example 2 of U.S. Pat. No. 2,532,374,
0.675 part of conc. ammonia,
12.075 parts of water.

The components of the mixture (a), with the exception of the water, are melted at 150°, the homogeneous melt is cooled to 100–110° and then slowly added, while stirring, to the boiling water. The emulsion formed is cooled to room temperature and the mixture (b) is added while stirring.

The resultant dry-bright emulsion wax is excellently suitable for the care of modern floors; it is self-polishing, but its gloss can still be increased by subsequent rubbing with a soft cloth. If this coating obtained on polyvinyl chloride tiles is washed with a moist cloth then the gloss value rises from 29 to 35 whilst, as a comparison, the gloss value of an emulsion produced according to the above example in which the wax body according to the invention is replaced by carnauba wax only rises on washing from 29.5 to 30.5.

A similar composition is obtained when replacing the triazinyl component in the above composition by an equivalent amount of 2-morpholino-4,6-bis-(N-methyl-N-n-octadecyl-amino)-s-triazine.

The s-triazine derivatives used in the above compositions are produced as follows:

(1) 48.2 parts of 6-chloro-2-(N-methyl-N-n-octadecyl-amino)-4-morpholino-s-triazine and 49.2 parts of 6-ethyl-amino-2-N-methyl-N-n-octadecylamino - 4 - morpholino-s-triazine are dissolved by heating in 400 parts by volume of anhydrous pyridine while stirring. The reaction mixture is then refluxed for 18 hours under an atmosphere of nitrogen whereupon it is filtered hot, the filtrate is concentrated to dryness in vacuo and the residue thoroughly washed with water and dried in vacuo. N,N-bis-[2'-N'-methyl - N' - n-octadecylamino-4'-morpholino-s-triazinyl-(6')]-N-ethyl-amine is obtained which, after recrystallisation from acetone, melts at 76–78°.

(2) 37 parts of cyanuric chloride are dissolved in 400 parts of anhydrous toluene and, at room temperature, a solution of 120 parts of N,N-dimethyl-N-n-octadecyl-amine in 400 parts of anhydrous toluene is added dropwise. The whole is then refluxed under an atmosphere of nitrogen until the calculated amount of chloromethane has been split off. The solvent is then distilled off in vacuo. After recrystallization from acetone, the 2-chloro-4,6-bis-N-methyl-N-n-octadecylamino - s - triazine melts at 58–62°.

34 parts of 2-chloro-4,6-bis-N-methyl-N-n-octadecyl-amino-s-triazine and 10 parts of morpholine are heated for 5 hours at 110–115° under an atmosphere of nitrogen. After cooling, excess morpholine and morpholine hydrochloride which have been formed are removed by washing with water and the residue is dried. 2-morpholino-4,6 - bis - (N-methyl-N-n-octadecylamino)-s-triazine is obtained, which after recrystallization from methyl alcohol melts at 80–82°.

5.0 parts of 2-(N'-methyl-piperazino)-4-morpholino-6-(N"-methyl-N"-n-octadecyl - amino) - s - triazine are dissolved in 95.0 parts of isopropanol, if necessary while heating, whereupon a clear solution is formed. This solution is excellently suitable for softening textiles particularly cotton towelling which has become hardened by repeated washing. Such goods are laid for a few minutes in a bath which contains 40 parts of the above-mentioned solution per 1000 parts by volume of water. After treatment in this bath, the goods are wrung out and dried in the air. Even greatly hardened and scratchy cotton towelling regains its original soft and fleecy handle. It is not rendered unduly water repellant by such treatment.

The textile softener compound used supra, is produced as follows:

185 parts of cyanuric chloride are dissolved in 1000 parts of carbon tetrachloride and 87.1 parts of morpholine are added while stirring intensively at 0° to 5°. A solution of 54 parts of sodium carbonate in 300 parts of water is then added. After stirring for 2 hours, a solution of 290 parts of N-methyl-N-n-octadecylamine in 1000 parts of carbon tetrachloride is added dropwise at 10 to 15° and then a solution of 54 parts of sodium carbonate in 300 parts of water is added dropwise. The whole is then slowly heated and afterwards refluxed for 5 hours. On completion of the reaction, the solvent is distilled off. The residue is stirred with 1500 parts of acetone. The undissolved part is filtered off under suction, thoroughly washed with water and dried. 2-chloro-4-morpholino-6-N-methyl - N - n - octadecylamino-s-triazine is obtained which, after recrystallization from alcohol, melts at 52–54°.

482 parts of 2-chloro-4-morpholino-6-N-methyl-N-n-octadecylamino-s-triazine and 110 parts of N-methylpiperizine are dissolved in 4000 parts of warm xylene and 45 parts of pulverized sodium hydroxide are added. The whole is then refluxed in a water separator under an atmosphere of nitrogen. On completion of the water separation, the mixture is refluxed for another 3 hours. The reaction mixture is filtered hot, the filtrate is evaporated to dryness in vacuo and the residue is stirred with 4000 parts of acetone. The solid, undissolved part is separated, thoroughly washed with water and dried in vacuo. 2-N'-methylpiperazino-4-morpholino - 6 - N" - methyl-N"-n-octadecylamino-s-triazine is obtained which, after recrystallisation from dioxan melts at 48–51°.

We claim:

1. A compound of the formula:

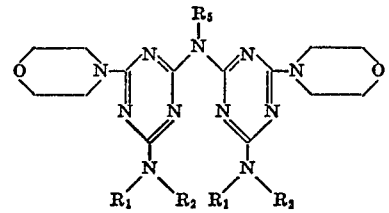

in which each of $R_1$ and $R_5$ represents alkyl of from 1 to 5 carbon atoms, and $R_2$ represents alkyl of from 10 to 18 carbon atoms.

2. A compound according to claim 1 which is N,N-bis-[2-(N - methyl-N-n-octadecylamino) - 4 - morpholino-s-triazinyl-(6)]-N-ethylamine.

No references cited.

ALEX MAZEL, Primary Examiner

J. TOVAR, Assistant Examiner

U.S. Cl. X.R.

106—2, 3, 6, 7, 8, 9, 10, 231, 238, 268, 270, 271, 287; 117—139, 139.5, 142, 147, 152, 161; 252—8.57, 8.8